United States Patent
Kurkure

(10) Patent No.: US 9,059,989 B2
(45) Date of Patent: Jun. 16, 2015

(54) HASH SYNCHRONIZATION FOR PREVENTING UNAUTHORIZED SERVER ACCESS USING STOLEN PASSWORDS

(71) Applicant: VMware, Inc., Palo Alto, CA (US)

(72) Inventor: Uday Kurkure, Los Altos Hills, CA (US)

(73) Assignee: VMware, Inc., Palo Alto, CA (US)

( * ) Notice: Subject to any disclaimer, the term of this patent is extended or adjusted under 35 U.S.C. 154(b) by 97 days.

(21) Appl. No.: 13/945,530

(22) Filed: Jul. 18, 2013

(65) Prior Publication Data

US 2015/0026784 A1 Jan. 22, 2015

(51) Int. Cl.
*H04L 29/06* (2006.01)
*H04L 9/08* (2006.01)

(52) U.S. Cl.
CPC ............. *H04L 63/083* (2013.01); *H04L 9/0861* (2013.01); *H04L 9/088* (2013.01)

(58) Field of Classification Search
CPC ...... H04L 63/083; H04L 9/0861; H04L 9/088
USPC .................................. 726/7, 27, 35; 713/184
See application file for complete search history.

(56) References Cited

U.S. PATENT DOCUMENTS

2008/0114983 A1 * 5/2008 Sherkin et al. ................ 713/171

FOREIGN PATENT DOCUMENTS

WO    WO 2013090308    *   6/2013

* cited by examiner

*Primary Examiner* — Harunur Rashid
*Assistant Examiner* — Angela Holmes

(57) ABSTRACT

Techniques for preventing unauthorized access to a server system using stolen passwords are provided. In one embodiment, the server system can store an ordered set of hash values for a user, where each hash value in the ordered set of hash values is generated by applying a hash function in an ordered set of hash functions to the user's password. The server system can further receive, from a client device, a login request for the user that includes a hashed version of the password, and can select a hash value in the ordered set of hash values using a server-side index that is synchronized with a client-side index on the client device. The server system can then grant the login request if the selected hash value matches the hashed version of the password.

15 Claims, 7 Drawing Sheets

HASH SYNCHRONIZATION FOR PREVENTING UNAUTHORIZED SERVER ACCESS USING STOLEN PASSWORDS

BACKGROUND

Many remote (e.g., client/server based) authentication systems today use password-based authentication. With this approach, a user that is authorized to access a secured server system selects (or is provided) a password, such as a sequence of alphanumeric characters. The password is stored on the server system. When the user wishes to login to the server system, the user transmits, via his/her client device, the password over a network to the server system. If the transmitted password matches the version stored on the server system, the user is granted access.

One pitfall with basic password-based authentication as described above pertains to the way in which the password is transmitted over the network from the client device to the server system. If the password is transmitted in plain text (i.e., unencrypted) form, a malicious agent may be able to "sniff" the network and intercept the password during transmission. The malicious agent may thereafter use the password to gain unauthorized server access.

To prevent this scenario, some password-based authentication systems rely on a one-way hashing function to hash the password, at the user's client device, at the time of a login attempt. The resulting hashed version of the password (referred to as a "hash" or "hash value") is then transmitted by the client device to the server system in lieu of the plain text password. This mechanism secures the password from network sniffers, since a network sniffer generally will not be able to recover the plain text password from its hashed version. At the server side, the server system receives the hashed version of the password and compares it to a password hash that the server system has previously computed (using the same one-way hash function as the client device). If the hashes match (indicating that the transmitted password is correct), the user is granted access.

Unfortunately, while password hashing works well for thwarting network sniffing attacks, password hashing by itself cannot protect against certain other types of attacks that malicious agents may use to compromise the security of a password-based authentication system. For example, a malicious agent may steal a user's password by "looking over the shoulder" of the user while he/she is typing the password into his/her client device, or by using a keystroke logging program to capture the user's keystrokes. In these instances, the hashing mechanism described above is ineffective because the malicious agent can steal the plain text password before it can be hashed. The malicious agent can subsequently take the stolen password and use it at any other client device (which will generally use the same one-way hash function as the original user's client device) in order to gain access to the server system.

SUMMARY

Techniques for preventing unauthorized access to a server system using stolen passwords are provided. In one embodiment, the server system can store an ordered set of hash values for a user, where each hash value in the ordered set of hash values is generated by applying a hash function in an ordered set of hash functions to the user's password. The server system can further receive, from a client device, a login request for the user that includes a hashed version of the password, and can select a hash value in the ordered set of hash values using a server-side index that is synchronized with a client-side index on the client device. The server system can then grant the login request if the selected hash value matches the hashed version of the password.

In another embodiment, a client device can store an ordered set of hash functions received from a server system. The client device can further receive, from a user, a password for logging into the server system, and can select a hash function in the ordered set of hash functions using a client-side index that is synchronized with a server-side index on the server system. The client device can then generate a hashed version of the password by applying the selected hash function to the password and can transmit a login request with the hashed version of the password to the server system.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques that uses hash synchronization (also referred to herein as "hash function synchronization") to prevent malicious agents from accessing a password-protected server system using stolen passwords. As used herein, the term "password" refers to any sequence of characters, numbers, and/or symbols that may be used for user authentication. For example, a password may be formed from a single word, multiple words (e.g., a phrase), or a string that does not correspond to any actual words. A password may also be purely numeric, such as personal identification number (PIN). In some embodiments, a password may be short enough to be memorized and entered by a user upon being presented with, e.g., a login screen. In other embodiments, a password may correspond to a longer set of data that is retrieved from a storage location, such as a credentials file, a security token, or the like. One of ordinary skill in the art will recognize many possible variations and alternatives.

Figure 1:
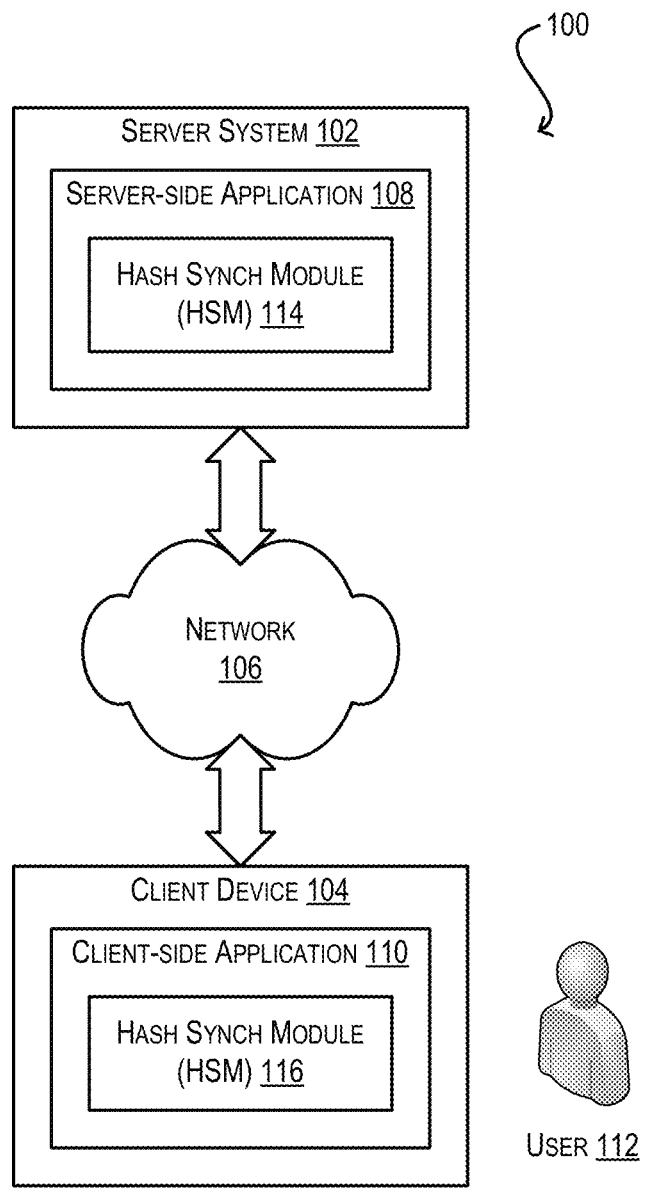
FIG. 1 depicts a system environment that supports hash synchronization for preventing unauthorized accesses to a password-protected server system according to an embodiment.

FIG. 1 depicts a system environment 100 that supports hash synchronization techniques according to an embodiment. As shown, system environment 100 includes a server system 102 that is communicatively coupled with a client device 104 via a network 106. Server system 102 executes a server-side application 108 that implements password-based authentication for controlling access to a secured resource. For example, server-side application 108 may be a password-based login portal for a secured file repository, a secured web application, or the like. In some embodiments, server-side application 108 can be implemented as a standalone program. In other embodiments, server-side application 108 can be implemented entirely or partially as a component of an operating system running on server system 102. Client device 104 executes a client-side application 110 that communicates with server-side application 108 and enables a user 112 to login to server system 102 upon providing a valid password, thereby allowing user 112 to access the secured resource. For example, client-side application 110 may be a web browser, a smartphone application, or the like. Like server-side application 108, client-side application 110 can be implemented as either a standalone program and/or a component of an operating system running on client device 104.

Although only a single client device and a single server system are depicted in FIG. 1, it should be appreciated that any number of these entities may be supported. For instance, in certain embodiments, system environment 100 can include multiple client devices, each executing a separate instance of client-side application 110. In these embodiments, each client device may be owned/operated by a different user, or several client devices may be owned/operated by the same user. In other embodiments, system environment 100 can include multiple server systems, each executing a separate instance of server-side application 108. In these embodiments, each instance of server-side application 108 may control access to the same secured resource or to different secured resources.

As noted in the Background section, some existing password-based authentication systems use password hashing to prevent malicious agents from intercepting a user's plain text password via network sniffing. While password hashing is effective against this particular type of attack, password hashing cannot prevent a malicious agent from stealing a user's password via other types of attacks, such as "over the shoulder" snooping or keystroke logging. Once the malicious agent has stolen the user's password using one of these alternative methods, the malicious agent can use the stolen password to login to a password-protected server system from any client device.

To address this deficiency, server-side application 108 of server system 102 and client-side application 110 of client device 104 can each include a hash synchronization module, or HSM (114 and 116 respectively). At a high level, HSMs 114 and 116 can agree upon an ordered set of one-way hash functions, such as {(1) SHA1, (2) MD4, (3) MD5}. HSMs 114 and 116 can then synchronously (i.e., in tandem) select different hash functions in the ordered set across different login attempts by user 112, thereby changing the hash function that is used to hash the entered password (on client device 104) and validate the hashed password (on server system 102) for each login attempt. For instance, for a first login attempt, HSM 116 of client device 104 can select SHA1 for hashing the entered password and HSM 114 of server system 102 can likewise select SHA1 for validating the hashed password upon receipt. For a second login attempt, HSM 116 can select MD4 for hashing the entered password and HSM 114 can likewise select MD4 for validating the hashed password upon receipt. And for a third login attempt, HSM 116 can select MD5 for hashing the entered password and HSM 114 can likewise select MD5 for validating the hashed password upon receipt.

Significantly, HSMs 114 and 116 can perform the synchronized hash function selection noted above using information that is only resident on, or known to, server system 102 and client device 104 (which is considered an "authorized" device of user 112). For example, the synchronized hash function selection can rely on counters that are maintained/updated only on server system 102 and client device 104, or instances of a common random number generation scheme that is known only to server system 102 and client device 104. As a result, user 112's password cannot be used to login to server system 102 from any client device other than authorized client device 104 (or another authorized client device of user 112), since unauthorized client devices will not have the necessary state information/knowledge to select the same hash function as HSM 114 of server system 102 for a given login attempt.

This, in turn, limits the ability of malicious agents to exploit stolen passwords in order to gain unauthorized access to server system 102. For instance, assume a malicious agent steals user 112's password via a keystroke logging program. Even with this password, the malicious agent cannot masquerade as user 112 and login to server system 102 from the malicious agent's own client device (i.e., an unauthorized device), because the HSM instance on the malicious agent's client device will not be "in sync" with HSM 114 on server system 102. The malicious agent can only use user's 112 password to access server system 102 via authorized client device 104, which the malicious agent may not have physical access to.

Figure 2A:
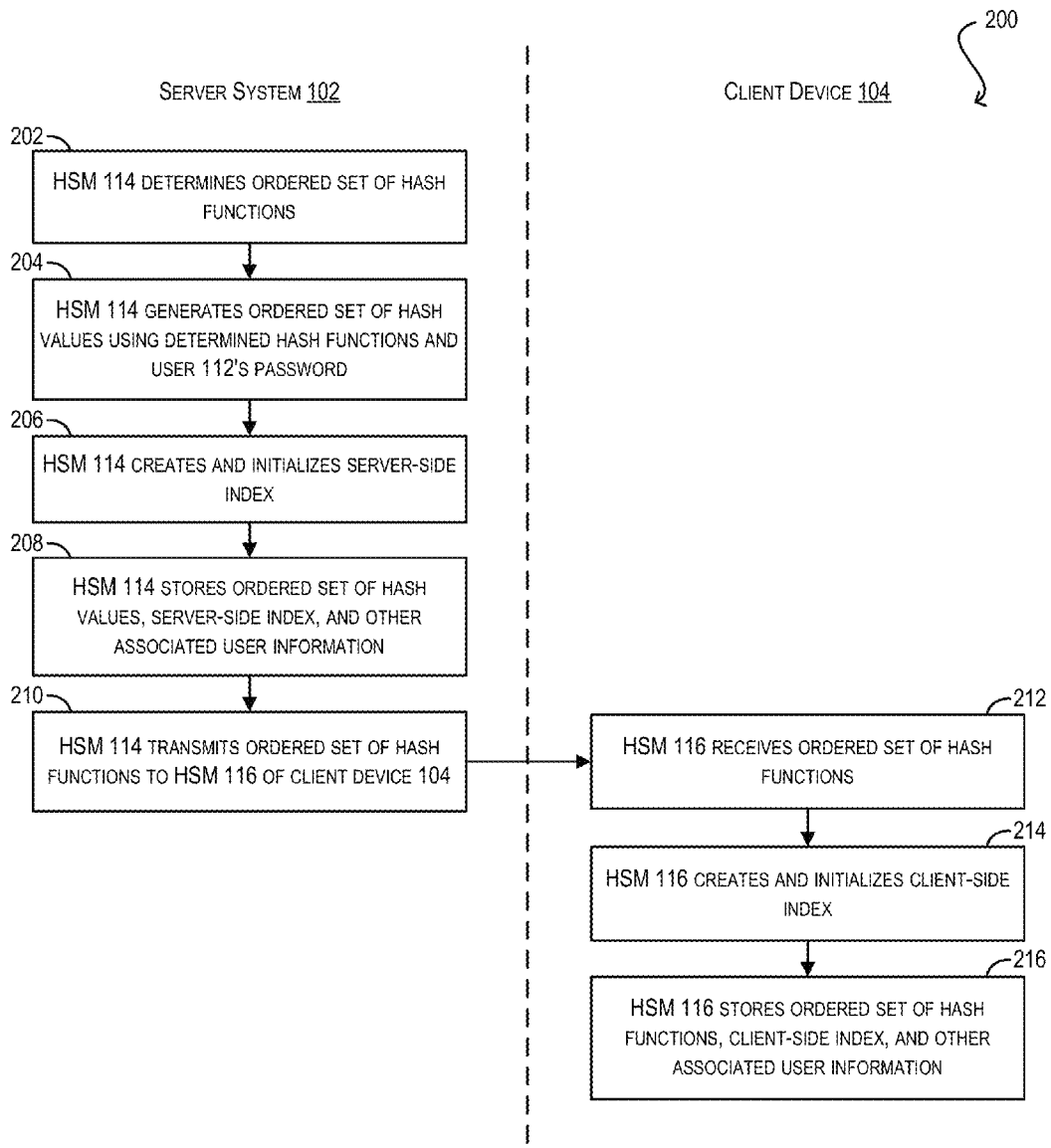
FIGS. 2A and 2B depict a first set of flows for processing a user login attempt using hash synchronization according to an embodiment.
Figure 2B:
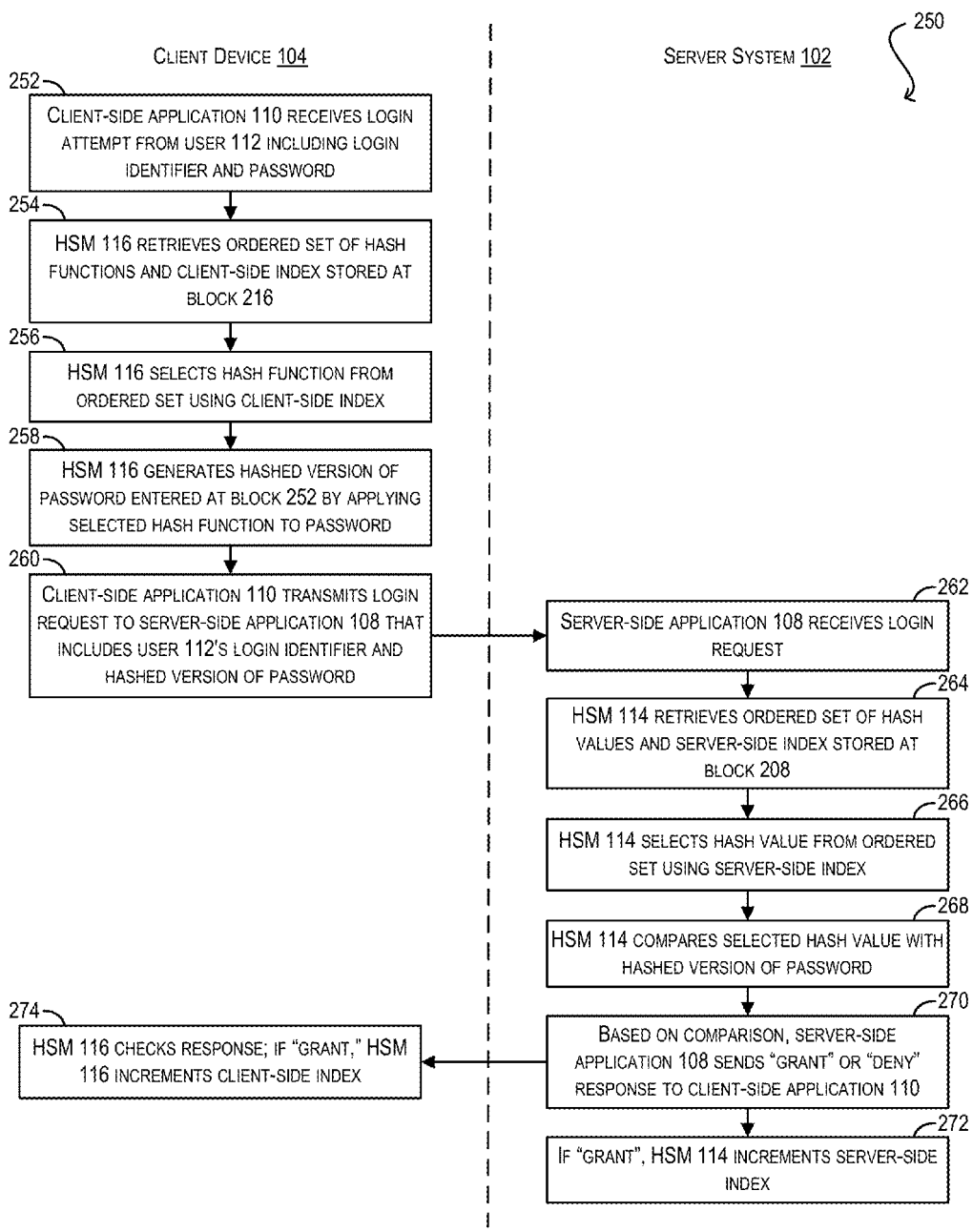

FIGS. 2A and 2B depict a first exemplary set of flows 200 and 250 that server system 102 and client device 104 can carry out for processing user login attempts using hash synchronization according to an embodiment. In flows 200 and 250, HSMs 114 and 116 can sequentially cycle through the hash functions in the ordered set of hash functions for successive user logins.

Flow 200 of FIG. 2A represents a setup phase that occurs prior to the processing of any login attempts. At block 202 of flow 200, HSM 114 of server system 102 can determine an ordered set of one-way hash functions that will be shared with HSM 116 of client device 104. As suggested previously, a one-way hash function is a mathematical function that calculates a hash value h from an input value i, such that i is very difficult to derive from h. Examples of well-known one-way hash functions include SHA1, SHA256, MD2, MD4, MD5, and so on. In one embodiment, HSM 114 can determine the number, type, and/or sequence of hash functions in the ordered set randomly. In other embodiments, one or more these characteristics of the ordered set can be manually selected by, e.g., an administrator of server system 102.

By way of example, HSM 114 can determine the following ordered set of hash functions at block 202:

TABLE 1

| Sequence Number | Hash Function |
|---|---|
| 1 | SHA1 |
| 2 | SHA256 |
| 3 | MD2 |
| 4 | MD4 |
| 5 | MD5 |

At block 204, HSM 114 can generate an ordered set of hash values that is specific to user 112 by applying each hash function in the ordered set of hash functions to user 112's password. For example, if user 112's password is "mypassword," the following hash values may be generated by applying the hash functions in Table 1 to "mypassword."

TABLE 2

| Sequence Number | Hash Function | Hash Value for "mypassword" |
| --- | --- | --- |
| 1 | SHA1 | 91dfd9ddb4198affc5c194cd8ce6d338fde470e2 |
| 2 | SHA256 | 398b7381b88d8697d8c48359152548d0 |
| 3 | MD2 | 34819d7beeabb9260a5c854bc85b3e44 |
| 4 | MD4 | 4bd44ba402231f35390c1ae3b76f0154 |
| 5 | MD5 | 34819d7beeabb9260a5c854bc85b3e44 |

Once the ordered set of hash values has been generated, HSM 114 can create and initialize a server-side index (e.g., an integer variable), such that the server-side index is set to the first sequence number in the ordered set of hash functions/values (block 206). For instance, with respect to tables 1 and 2 above, the server-side index would be initially set to 1. HSM 114 can then store the ordered set of hash values, the server-side index, and other relevant information regarding user 112 (e.g., user 112's login identifier and password) on server system 102, and can transmit the ordered set of hash functions to HSM 116 of client device 104 (blocks 208 and 210).

At block 212, HSM 116 can receive the ordered set of hash functions transmitted by HSM 114. In response, HSM 116 can create and initialize a client-size index (e.g., an integer variable), such that the client-side index is initialized to the same starting value as the server-side index described at block 206 (i.e., the first sequence number in the ordered list of hash functions) (block 214). For instance, with respect to table 1 above, the client-side index would be initially set to 1. In this manner, the client-side index can be synchronized with the server-side index.

Finally, at block 216, HSM 116 can store the ordered set of hash functions, the client-side index, and other relevant information regarding user 112 (e.g., user 112's login identifier) on client device 104. The setup phase can subsequently end and server system 102/client device 104 can move on to processing login attempts from user 112 as depicted in flow 250 of FIG. 2B.

At block 252 of flow 250, client-side application 110 of client device 104 can receive user input corresponding to a first login attempt by user 112. The user input can include, e.g., user 112's login identifier and an entered password.

In response, HSM 116 can retrieve the ordered set of hash functions and the client-side index previously stored at block 216 (block 254), select a hash function in the ordered set using the client-side index (block 256), and apply the selected hash function to the entered password, thereby generating a hashed version of the password (block 258). Recall that, in the example discussed above, the client-side index was initialized to a value of 1 (corresponding to hash function SHA1 in table 1). Accordingly, in this example, blocks 256 and 258 would comprise selecting hash function SHA1 and applying SHA1 to the entered password. Once the hashed version of the password is generated, client-side application 110 can transmit a login request to server-side application 108 of server system 102 that includes user 112's login identifier and the hashed version of the password (block 260).

At blocks 262 and 264, server-side application 108 can receive the login request and HSM 114 can retrieve the ordered set of hash values for user 112 and the server-side index previously stored at block 208. HSM 114 can then select a hash value in the ordered set of hash values using the server-side index (block 266) and compare the selected hash value with the hashed version of the password (block 268). Returning again to the example discussed above, recall that the server-side index was initialized to a value of 1 (corresponding to hash function SHA1). Accordingly, in this example, blocks 266 and 268 would comprise selecting the hash value in row 1 of table 2 (i.e., the hash value computed using hash function SHA1) and comparing this hash value with the hashed password. Note that this hash value corresponds to the hash function that HSM 116 of client device 104 used to hash the entered password at block 258 (i.e., SHA1) because the server-side and client-side indexes are synchronized.

Once HSM 114 has compared the selected hash value with the hashed version of the password, server-side application 108 can transmit an appropriate "grant" or deny" response to client-side application 110 for the login attempt (e.g., "grant" if the hashes match, "deny" if the hashes do not match) (block 270). Further, if a "grant" response is transmitted (indicating a successful login attempt), HSM 114 can increment the server-side index on server system 102 (block 272).

At block 274, HSM 116 of client-side application 110 can receive the response sent by server-side application 108 and check the result (either "grant" or "deny"). If the result is "grant," HSM 116 can also increment the client-side index on client device 104, thereby keeping the client-side index in sync with the server-side index.

Finally, although not shown in FIG. 2B, flow 250 can return to block 252 so that server system 102 and client device 104 can process additional login attempts by user 112. Since the server-side index and the client-side index are incremented in a synchronized fashion upon each successful login attempt (per blocks 272 and 274), HSMs 114 and 116 will cycle through the ordered set of hash functions for successive logins. For example, with respect to table 1 above, HSMs 114 and 116 would use SHA256 for the second login, MD2 for the third login, MD4 for the fourth login, and so on.

In situations where all of the hash functions in the ordered set have been cycled through, HSMs 114 and 116 can rollover the server-side and client-side indexes respectively to their initial values (i.e., 1). This allows user 112 to continue to login to server 102 via client device 104. Alternatively, upon cycling through all of the hash functions, server system 102 can reject all further login attempts from client device 104. In this latter case, the total number of hash functions in the ordered set essentially acts as a limit on the number of logins available to user 112 via client device 104—once the server-side and client-side indexes reach that number, no additional logins are allowed.

With the hash synchronization processing shown in FIGS. 2A and 2B, even if a malicious agent were to steal user 112's password, the malicious agent would not be able to login to server system 102 using his/her own client device because the malicious agent's client device would not have an accurate client-side index that is synchronized with the server-side index on server system 102. For instance, assume user 112 logs in twice to server system 102 using client device 104, and the malicious agent steals user 112's password after the second login. In this scenario, the server-side index on server system 102 and the client-side index on client device 104 would be set to 3 (in other words, incremented twice). However, the malicious agent's client device does not know how many times these indexes have been incremented (or whether they have been incremented at all). As a result, when the malicious user attempts to login to server system 102 from his/her client device using user 112's password, the client-side index on the malicious user's client device will (most likely) fail to match the server-side index on server system 102. This, in turn, will cause the malicious agent's client device to use a hash function for hashing user 112's password that is different from the hash function used by server system 104 for validating the hashed password, thereby causing the server-side hash comparison to fail (and resulting in a denial of access).

Figure 3A:
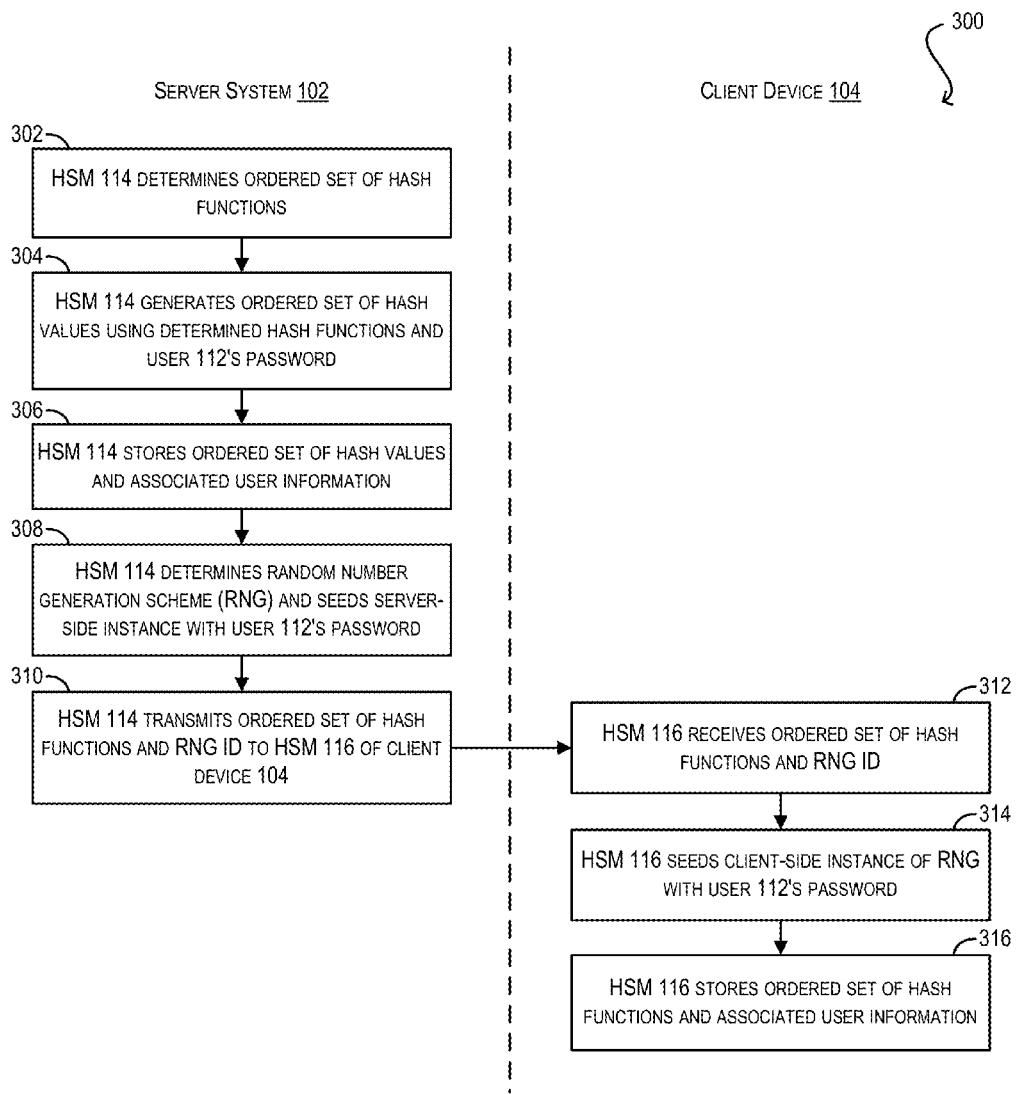
FIGS. 3A and 3B depict a second set of flows for processing a user login attempt using hash synchronization according to an embodiment.
Figure 3B:
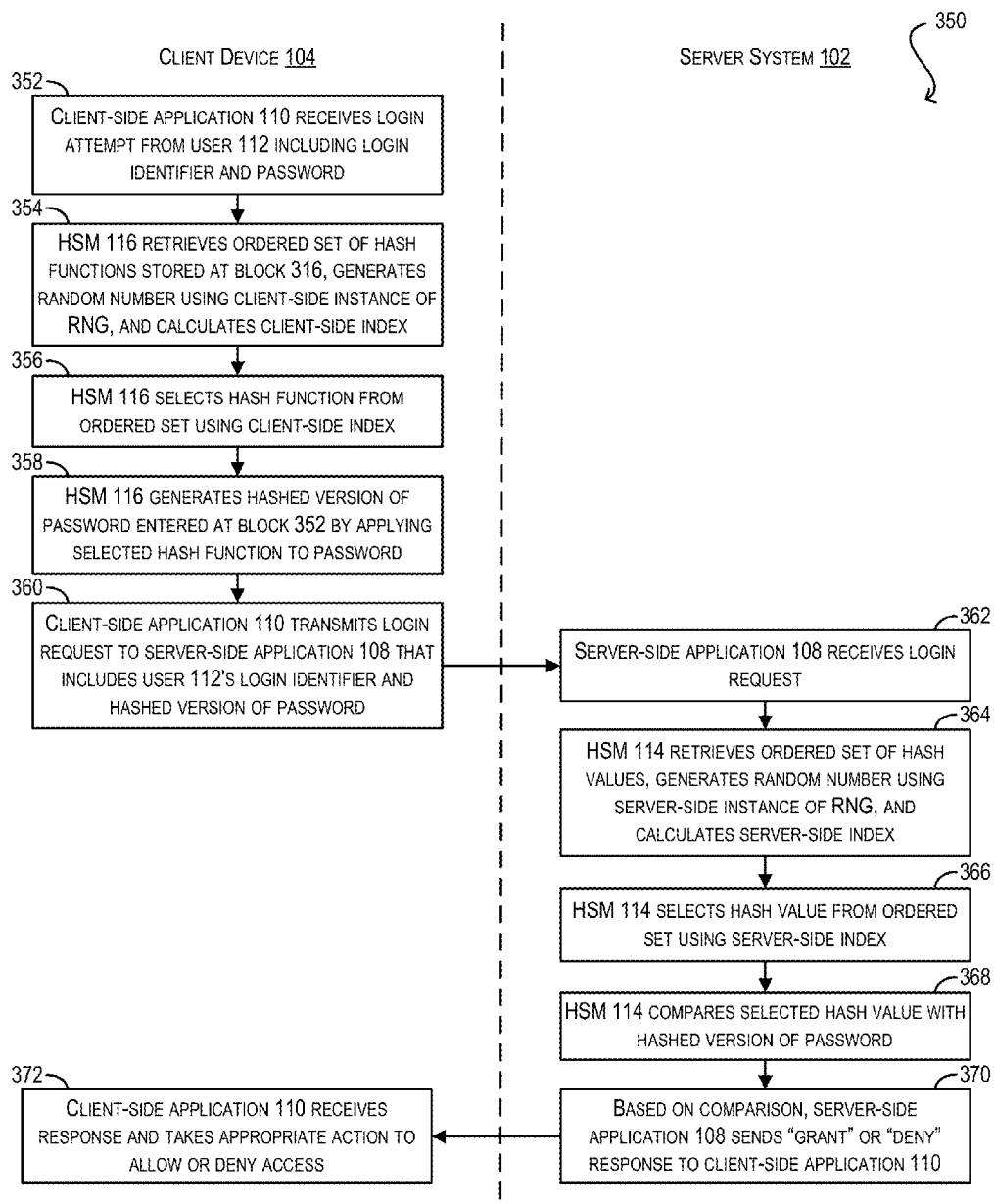

One potential weakness with the approach of FIGS. 2A and 2B is that HSMs 114 and 116 will always cycle through the hash functions in the ordered set of hash functions according to same sequence—namely, the sequence defined by the ordered set. This may provide an opening for a malicious agent to somehow predict the appropriate client-side index for a given login attempt. To address this potential issue, FIGS. 3A and 3B depict a second set of exemplary flows 300 and 350 that server system 102 and client device 104 can carry out for processing user login attempts using hash synchronization according to an embodiment. In flows 300 and 350, HSMs 114 and 116 can use a common random number generation scheme to randomly select hash functions in synchrony, rather than cycling through the hash functions in a fixed order.

Like flow 200 of FIG. 2A, flow 300 of FIG. 3A represents a setup phase that occurs before the processing of any login attempts. Blocks 302-306 of flow 300 are substantially similar to blocks 202, 204, and 208 of flow 200—HSM 114 of server system 102 determines an ordered set of hash functions and generates/stores an ordered set of hash values for user 112 based on the hash functions and user's 112 password.

However, rather than initializing a server-side index as in flow 200, at block 308 HSM 114 can determine a random number generation scheme (RNG) to be shared with HSM 116 of client device 104 and can seed a server-side instance of the RNG with user 112's password. HSM 114 can then transmit the ordered set of hash functions and an identification of the RNG to HSM 116 (block 310).

At block 312, HSM 116 can receive the ordered set of hash functions and the RND ID from HSM 114. In response, HSM 116 can initialize a client-side instance of the RNG and seed the client-side instance with the same seed value used on the server-side (i.e., user 112's password) (block 314). In this manner, HSM 116 can ensure that the client-side instance of the RNG generates the same sequence of random numbers as the server-side instance.

Finally, at block 316, HSM 116 can store the ordered set of hash functions and other relevant information regarding user 112 (e.g., user 112's login identifier) on client device 104. The setup phase can subsequently end and server system 102/client device 104 can move on to processing login attempts from user 112 as depicted in flow 350 of FIG. 3B.

At block 352 of flow 350, client-side application 110 of client device 104 can receive user input corresponding to a login attempt by user 112. The user input can include, e.g., user 112's login identifier and an entered password.

In response, HSM 116 can retrieve the ordered set of hash functions previously stored at block 316, generate a random number using the client-side instance of the RNG, and calculate a client-side index based on the random number (random_num) and the total number of hash functions (num_hash_functions) in the ordered set (block 354). In a particular embodiment, HSM 116 can calculate the client-side index as random_num modulo num_hash_functions, although other algorithms may also be used. HSM 116 can then select a hash function in the ordered set of hash functions using the client-side index (block 356) and apply the selected hash function to the entered password, thereby generating a hashed version of the password (block 358).

Once the hashed version of the password is generated, client-side application 110 can transmit a login request to server-side application 108 of server system 102 that includes user 112's login identifier and the hashed version of the password (block 360).

At block 362, server-side application 108 can receive the login request transmitted by client-side application 110. In response, HSM 114 can retrieve the ordered set of hash values for user 112 previously stored at block 306, generate a random number using the server-side instance of the RNG, and calculate a server-side index based on the random number and the total number of hash values in the ordered set (block 364). Generally speaking, HSM 116 will calculate the server-side index using the same algorithm that HSM 114 of client device 104 used to calculate the client-side index at block 354. Further, the random number generated by the server-side instance of the RNG will match the random number generated by the client-side instance of the RNG (since the two instances were seeded with the same seed value—user 112's password). Accordingly, the server-side index calculated at block 364 will generally match the client-side index calculated at block 354.

Upon calculating the server-side index, HSM 114 can select a hash value from the ordered set of hash values using the server-side index (block 366) and compare the selected hash value with the hashed version of the password (block 368). Server-side application 108 can then transmit an appropriate "grant" or deny" response to client-side application 110 for the login attempt (e.g., "grant" if the hashes match, "deny" if the hashes do not match) (block 370).

At block 372, client-side application 110 can receive the response sent by server-side application 108 and can take appropriate action to allow or deny access based on the result. Flow 350 can thereafter return to block 352 so that server system 102 and client device 104 can process additional login attempts by user 112.

With the randomized hash synchronization processing shown in FIGS. 3A and 3B, if a malicious agent steals user 112's password, the malicious agent will not be able to login to server system 102 from his/her own client device because malicious agent's client device will not know the RNG common to server system 102 and client device 104 (i.e., user 112's authorized device). Further, even if the malicious agent finds out the RNG, the RNG instance running on the malicious agent's client device will not necessarily be "in sync" with the server-side RNG instance. For example, assume user 112 logs in once to server system 102 using client device 104, and the malicious agent steals user 112's password after the first login. In this scenario, the server-side RNG instance will be configured to generate the second random number in the seeded sequence for the next login attempt. However, the malicious agent's client device does not know this "sequence position" of the server-side RNG instance (since the malicious agent's client device does not know how many random numbers have already been generated). As a result, when the malicious user attempts to login to server system 102 from his/her client device using user 112's password, the random number generated by the malicious user's client device will (most likely) fail to match the random number generated by server system 102. This, in turn, will cause the malicious agent's client device to use a hash function for hashing user 112's password that is different from the hash function used by server system 104 for validating the hashed password, thereby causing the server-side hash comparison to fail (and resulting in a denial of access).

Figure 4A:
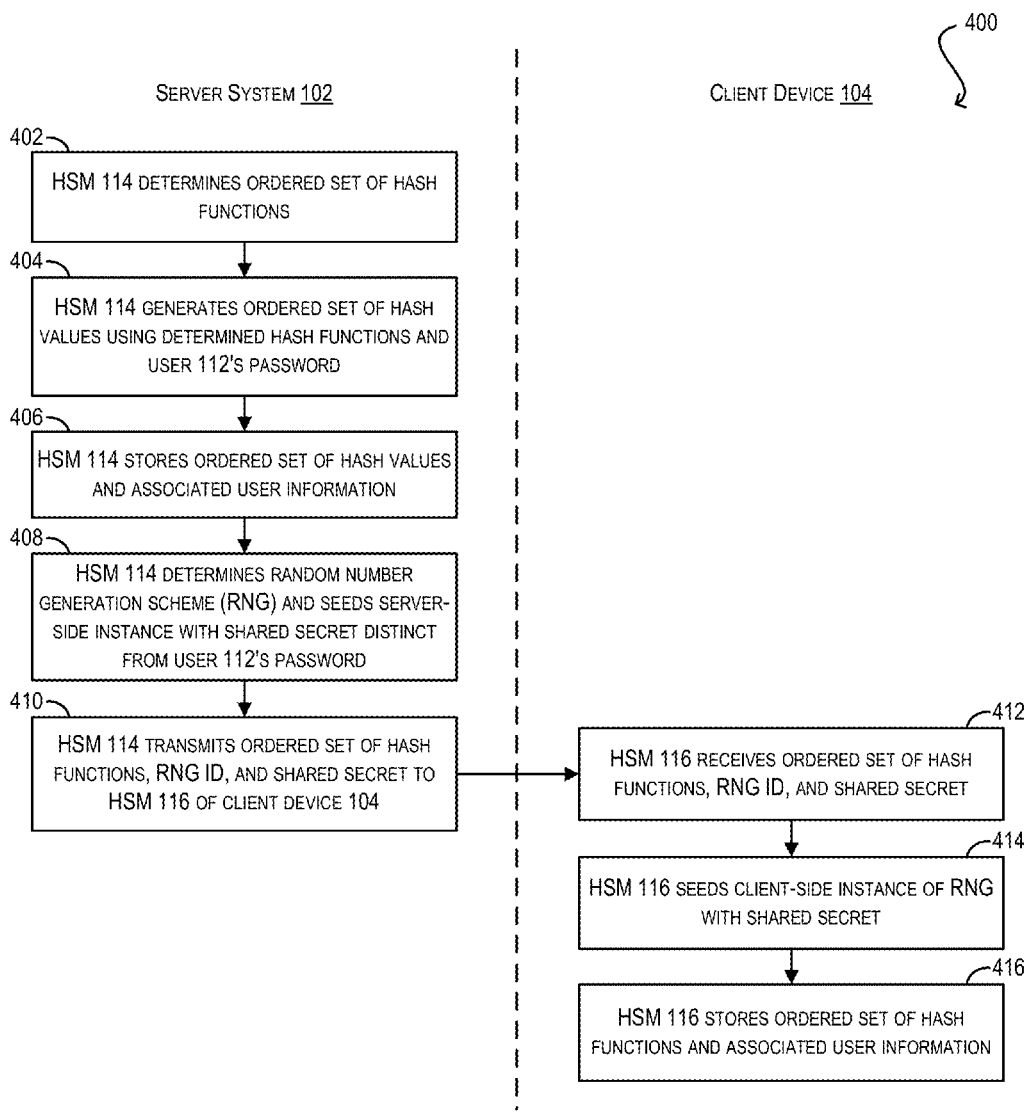
FIGS. 4A and 4B depict a third set of flows for processing a user login attempt using hash synchronization according to an embodiment.
Figure 4B:
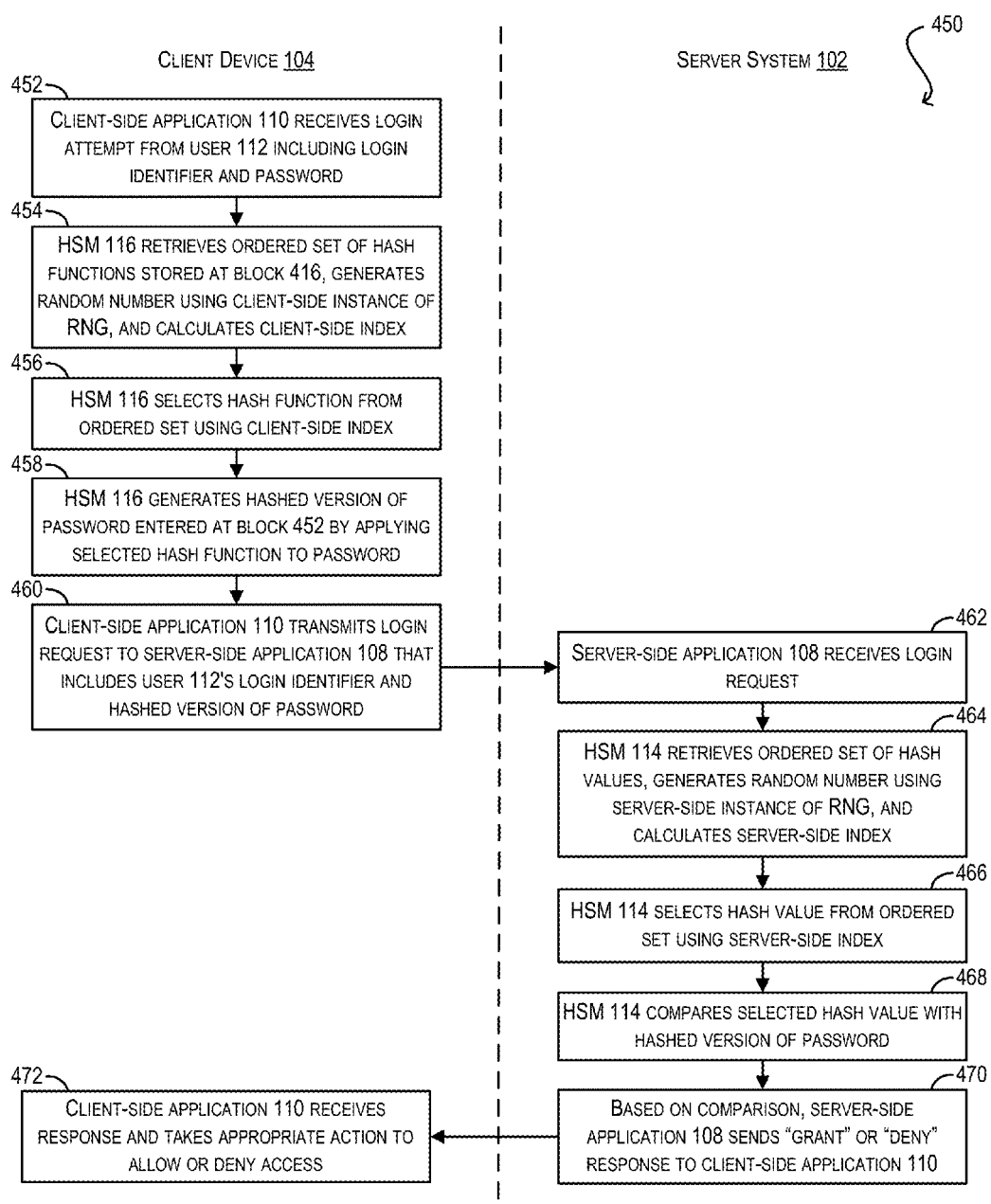

FIGS. 4A and 4B depict a third exemplary set of flows 400 and 450 that server system 102 and client device 104 can carry out for processing user login attempts using hash synchronization according to an embodiment. Like flows 300 and 350 of FIGS. 3A and 3B, flows 400 and 450 rely on a common random number scheme for hash function selection. Thus, the steps of flows 400 and 450 are, for the most part, similar to flows 300 and 350 and are not discussed in detail here.

The one way in which flows 400 and 450 differ from flows 300 and 350 pertains to the way in which the server-side and client-side RNG instances are seeded. Recall that in flows 300 and 350, the server-side and client-side RNG instances are simply seeded with user 112's password. In contrast, in flows 400 and 450, the server-side and client-side RNG instances can be seeded with a separate shared secret (i.e., a secret shared between server system 102 and client device 104) that is distinct from user 112's password (see, e.g., blocks 408-414 of FIG. 4A). For instance, in one embodiment, the separate shared secret can be a preconfigured constant. In another embodiment, the separate shared secret can be a counter that is incremented in synchrony by server system 102 and client system 104 for every successful login attempt (like the indexes in the embodiment of FIGS. 2A and 2B). In yet another embodiment, the separate shared secret can be a combination of these or other features (e.g., counter value× preconfigured constant). By using a separate shared secret for seeding purposes, the overall security of the system can be improved because a malicious agent will not be able to seed the RNG will the password alone.

It should be noted that the embodiments of FIGS. 2A, 2B, 3A, 3B, 4A, and 4B assume that user 112 only has a single authorized client device (i.e., device 104) that he/she uses to access a single server system 102. Accordingly, in these embodiments, HSMs 114 and 116 maintain a single copy of the state information needed to enable hash synchronization (e.g., the server-side and client-side indexes or the server-side and client-side RNG instances) However, in some scenarios, user 112 may own multiple client devices that he/she wishes to use to access server system 102 (or a different server system).

To address these situations, in certain embodiments HSMs 114 and 116 can maintain the state information noted above for multiple {client device, server system} pairs. For example, HSMs 114 and 116 can maintain a separate set of indexes and/or RNG instances for {client device C1, server system S1}, {client device C2, server system S1}, and so on. This allows each client device of user 112 (which are all considered "authorized" client devices) to independently synchronize their hash functions with server system 102 (or a different server system).

In further embodiments, HSMs 114 and 116 can also maintain separate instances of the ordered set of hash functions and/or the common RNG for multiple { client device, server system} pairs, such that each pair is assigned a different hash function set or a different RNG. This enhances the security of the system, since a malicious agent will be not be able to reuse the hash functions or RNG assigned to client device 104 on a different, unauthorized device.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Many variations, modifications, additions, and improvements to the embodiments described herein are possible. For example, plural instances can be provided for components, operations, or structures described herein as a single instance. Further, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for preventing unauthorized access to a server system using stolen passwords, the method comprising:
    storing, by the server system, an ordered set of hash values for a user, each hash value in the ordered set of hash values being generated by applying each hash function in the ordered set of hash functions to the user's password;
    receiving, by the server system, a login request for the user from a client device, the login request including a hashed version of the password, wherein the client device generates the hashed version of the password by:
        selecting a hash function in the ordered set of hash functions using the client-side index; and
        applying the selected hash function to the password;
    selecting, by the server system, a hash value in the ordered set of hash values using a server-side index that is synchronized with a client-side index on the client device; and
    granting, by the server system, the login request if the hash value matches the hashed version of the password wherein the server-side index and the client-side index are initialized to a common starting value, and wherein the server-side index and the client-side index are set to a next common value by the server system and client device respectively if the login request is granted wherein the next common value for the server-side index and the client-side index is determined using a common random number generation scheme.

2. The method of claim 1 wherein the server system and the client device seed the common random number generation scheme using the password.

3. The method of claim 2 wherein the server system and the client device seed the random number generation scheme using a shared secret that is distinct from the password.

4. A method for preventing unauthorized access to a server system using stolen passwords, the method comprising:
    storing, by a client device, an ordered set of hash functions;
    receiving, by the client device, a password for logging into the server system;
    selecting, by the client device, a hash function in the ordered set of hash functions using a client-side index that is synchronized with a server-side index on the server system;
    generating, by the client device, a hashed version of the password by applying the selected hash function to the password; and
    transmitting, by the client device, a login request with the hashed version of the password to the server system wherein the server-side index and the client-side index are initialized to a common starting value, and wherein the server-side index and the client-side index are set to a next common value by the server system and client device respectively if the login request is granted wherein the next common value for the server-side index and the client-side index is determined using a common random number generation scheme.

5. A non-transitory computer readable storage medium having stored thereon computer software executable by a processor of a server system, the computer software embodying a method for preventing unauthorized access to the server system using stolen passwords, the method comprising:
    storing an ordered set of hash values for a user, each hash value in the ordered set of hash values being generated by applying each hash function in an ordered set of hash functions to the user's password;
    receiving a login request for the user from a client device, the login request including a hashed version of the password, wherein the client device selects the hashed version of the password by selecting a hash value from the ordered set of hash functions using the client-side index;
    selecting a hash value in the ordered set of hash values using a server-side index that is synchronized with a client-side index on the client device; and
    granting the login request if the hash value matches the hashed version of the password wherein the server-side index and the client-side index are initialized to a common starting value, and wherein the server-side index and the client-side index are set to a next common value by the server system and client device respectively if the login request is granted wherein the next common value for the server-side index and the client-side index is determined using a common random number generation scheme.

6. The non-transitory computer readable storage medium of claim 5 wherein the server system and the client device seed the random number generation scheme using the password.

7. The non-transitory computer readable storage medium of claim 6 wherein the server system and the client device seed the random number generation scheme using a shared secret that is distinct from the password.

8. A non-transitory computer readable storage medium having stored thereon computer software executable by a processor of a client device that is in communication with a server system, the computer software embodying a method for preventing unauthorized access to the server system using stolen passwords, the method comprising:
    storing an ordered set of hash functions;
    receiving a password for logging into the server system;
    selecting a hash function in the ordered set of hash functions using a client-side index that is synchronized with a server-side index on the server system;
    generating a hashed version of the password by applying the selected hash function to the password; and
    transmitting a login request with the hashed version of the password to the server system wherein the server-side index and the client-side index are initialized to a common starting value, and wherein the server-side index and the client-side index are set to a next common value by the server system and client device respectively if the login request is granted wherein the next common value for the server-side index and the client-side index is determined using a common random number generation scheme.

9. A server system comprising:
    a processor; and
    a non-transitory computer readable medium having stored thereon program code that, when executed by the processor, causes the processor to:
        store an ordered set of hash values for a user, each hash value in the ordered set of hash values being generated by applying a hash function in an ordered set of hash functions to the user's password;
    receive a login request for the user from a client device, the login request including a hashed version of the password, wherein the client device generates the hashed version of the password by:
        selecting a hash function in the ordered set of hash functions using the client-side index; and
        applying the selected hash function to the password;

select a hash value in the ordered set of hash values using a server-side index that is synchronized with a client-side index on the client device; and grant the login request if the hash value matches the hashed version of the password wherein the server-side index and the client-side index are initialized to a common starting value, and wherein the server-side index and the client-side index are set to a next common value by the server system and client device respectively if the login request is granted wherein the next common value for the server-side index and the client-side index is determined by the server system and the client device respectively using a common random number generation scheme.

10. The server system of claim 9 wherein the server system and the client device seed the random number generation scheme using the password.

11. The server system of claim 10 wherein the server system and the client device seed the random number generation scheme using a shared secret that is distinct from the password.

12. A client device comprising:
a processor; and
a non-transitory computer readable medium having stored thereon program code that, when executed by the processor, causes the processor to:
store an ordered set of hash functions;
receive, from the user, a password for logging into the server system;
select a hash function in the ordered set of hash functions using a client-side index that is synchronized with a server-side index on the server system;
generate a hashed version of the password by applying the selected hash function to the password; and
transmit a login request with the hashed version of the password to the server system wherein the server-side index and the client-side index are initialized to a common starting value, and wherein the server-side index and the client-side index are set to a next common value by the server system and client device respectively if the login request is granted wherein the next common value for the server-side index and the client-side index is determined by the server system and the client device respectively using a common random number generation scheme.

13. A method for preventing unauthorized access to a server system using stolen passwords, the method comprising:
storing, by the server system, an ordered set of hash values for a user, each hash value in the ordered set of hash values being generated by applying each hash function in the ordered set of hash functions to the user's password;
receiving, by the server system, a login request for the user from a client device, the login request including a hashed version of the password, wherein the client device generates the hashed version of the password by:
selecting a hash function in the ordered set of hash functions using the client-side index; and
applying the selected hash function to the password;
selecting, by the server system, a hash value in the ordered set of hash values using a server-side index that is synchronized with a client-side index on the client device; and granting, by the server system, the login request if the hash value matches the hashed version of the password wherein the server-side index and the client-side index are initialized to a common starting value, and wherein the server-side index and the client-side index are set to a next common value by the server system and client device respectively if the login request is granted wherein the next common value for the server-side index and the client-side index is determined by incrementing the common value.

14. A non-transitory computer readable storage medium having stored thereon computer software executable by a processor of a server system, the computer software embodying a method for preventing unauthorized access to the server system using stolen passwords, the method comprising:
storing an ordered set of hash values for a user, each hash value in the ordered set of hash values being generated by applying each hash function in an ordered set of hash functions to the user's password;
receiving a login request for the user from a client device, the login request including a hashed version of the password, wherein the client device selects the hashed version of the password by selecting a hash value from the ordered set of hash functions using the client-side index;
selecting a hash value in the ordered set of hash values using a server-side index that is synchronized with a client-side index on the client device; and
granting the login request if the hash value matches the hashed version of the password wherein the server-side index and the client-side index are initialized to a common starting value, and wherein the server-side index and the client-side index are set to a next common value by the server system and client device respectively if the login request is granted wherein the next common value for the server-side index and the client-side index is determined by incrementing the common value.

15. server system comprising:
a processor; and
a non-transitory computer readable medium having stored thereon program code that, when executed by the processor, causes the processor to:
store an ordered set of hash values for a user, each hash value in the ordered set of hash values being generated by applying a hash function in an ordered set of hash functions to the user's password;
receive a login request for the user from a client device, the login request including a hashed version of the password, wherein the client device generates the hashed version of the password by:
selecting a hash function in the ordered set of hash functions using the client-side index; and
applying the selected hash function to the password;
select a hash value in the ordered set of hash values using a server-side index that is synchronized with a client-side index on the client device; and
grant the login request if the hash value matches the hashed version of the password wherein the server-side index and the client-side index are initialized to a common starting value, and wherein the server-side index and the client-side index are set to a next common value by the server system and client device respectively if the login request is granted wherein the next common value for the server-side index and the client-side index is determined by incrementing the common value.

* * * * *